(12) United States Patent
Koller

(10) Patent No.: US 6,364,583 B1
(45) Date of Patent: Apr. 2, 2002

(54) TELESCOPIC LOAD BEAM WITH LONGITUDINAL LOCKING DEVICE

(75) Inventor: Karl Koller, Stein am Rhein (CH)

(73) Assignee: Ancra Jungfalk GmbH, Engen (DE)

( * ) Notice: Subject to any disclaimer, the term of this patent is extended or adjusted under 35 U.S.C. 154(b) by 0 days.

(21) Appl. No.: 09/530,762
(22) PCT Filed: Nov. 13, 1998
(86) PCT No.: PCT/EP98/07261
§ 371 Date: May 2, 2000
§ 102(e) Date: May 2, 2000
(87) PCT Pub. No.: WO99/25583
PCT Pub. Date: May 27, 1999

(30) Foreign Application Priority Data

Nov. 14, 1997 (DE) .................................. 297 20 154 U

(51) Int. Cl.[7] .................................................. B60P 7/15
(52) U.S. Cl. ...................... 410/89; 410/143; 410/145; 410/151
(58) Field of Search ........................ 410/89, 143, 144, 410/145, 149, 151; 211/105.3; 248/354.5, 354.6, 354.7

(56) References Cited

U.S. PATENT DOCUMENTS

| | | | |
|---|---|---|---|
| 1,455,617 A | * | 5/1923 | Jackson |
| 2,506,508 A | * | 5/1950 | Kmita |
| 2,627,821 A | * | 2/1953 | Sjogren ...................... 410/145 |
| 3,612,463 A | * | 10/1971 | Grant .......................... 410/95 |
| 4,079,677 A | | 3/1978 | Vandergriff et al. |
| 5,014,954 A | * | 5/1991 | Merl .................... 211/105.3 X |
| 5,472,301 A | | 12/1995 | Wallen ........................ 410/151 |
| 6,062,780 A | * | 5/2000 | Petelka ........................ 410/89 |
| 6,068,433 A | * | 5/2000 | Baloga ........................ 410/145 |
| 6,074,143 A | * | 6/2000 | Langston et al. ............. 410/89 |

FOREIGN PATENT DOCUMENTS

| | | |
|---|---|---|
| DE | 1743996 | 4/1957 |
| EP | 0477032 | 3/1992 |

* cited by examiner

*Primary Examiner*—Stephen T. Gordon
(74) *Attorney, Agent, or Firm*—Bachman & LaPointe, P.C.

(57) ABSTRACT

The invention relates to a telescopic load beam with an elongated profile element (24) and a telescopic element (26) which is displaceable at the end therein and axially relative thereto wherein provided for releasably fixing a relative position between the profile element (24) and the telescopic element (26) is a locking arrangement (30, 34) which has a retaining lever (34) pivotably arranged on one of the profile element and the telescopic element, and an engagement portion (30) which is formed for co-operation with a retaining groove (38) in the pivotal lever and which is fixed to the other of the profile element and the telescopic element, wherein the pivotal lever (34) is preferably of such a configuration that it can be automatically moved into a locking position by the profile element (24) and the telescopic element (26) being pulled apart.

9 Claims, 3 Drawing Sheets

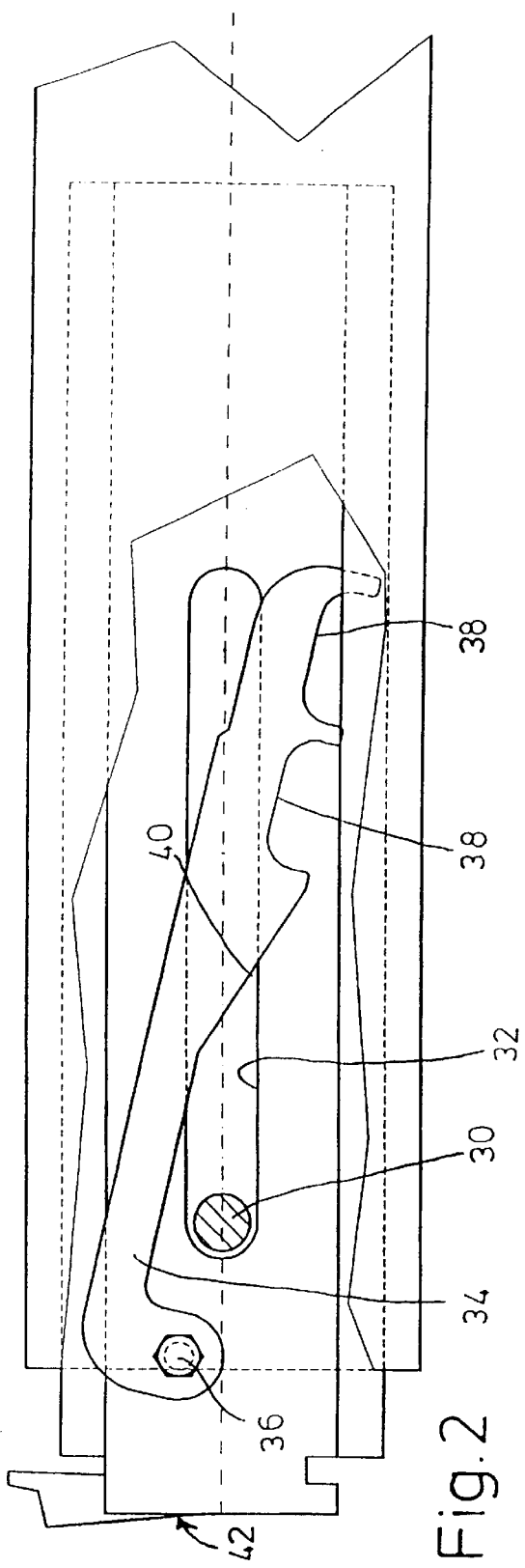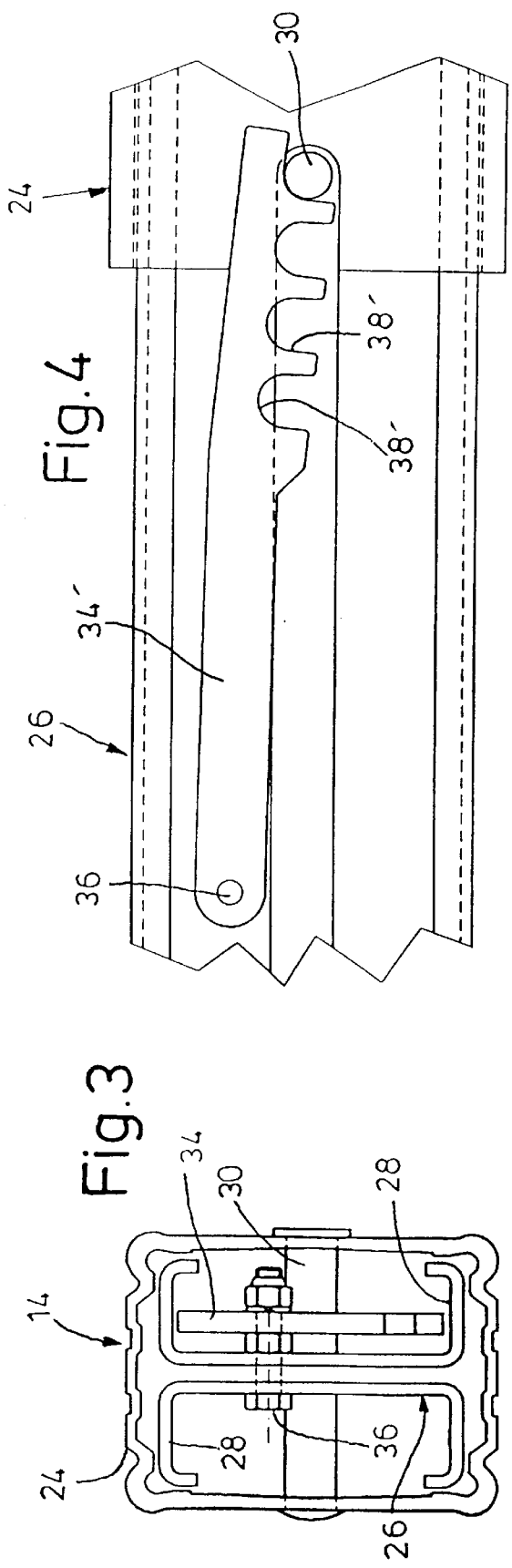

TELESCOPIC LOAD BEAM WITH LONGITUDINAL LOCKING DEVICE

BACKGROUND OF THE INVENTION

The present invention concerns a telescopic load beam.

Load beams of that kind are used in load spaces of commercial vehicles in order to form for example intermediate layers for placing load items thereon.

The patentees' German patent application No 44 12 067 discloses a load beam.

It will be noted however that such a carrier arrangement in the structure of a commercial vehicle concerns a fixed closed load space with stiff side walls which already impart a certain degree of basic stability to the carrier arrangement. For that purpose the load beams which are known from the state of the art and which usually extend transversely and centrally through the load space can be fixed to lateral holding elements and provided with a device which permits a variation in the length of the load beam or lengthwise adaptation thereof; in the case of above-mentioned DE 44 12 067 that is effected for example by virtue of the load beam being of a telescopic configuration, by means of two elements which are displaceable relative to each other, against the force of a tightening spring. The purpose of the (limited) variation in length of the load beam is to simplify fitting or assembly of the load beam in the load space.

Particularly in relation to use with canvas-backed vehicles however such a design configuration is inadequate for reasons of stability: due to the lack of stabilization of a fixed load space, the carrier superstructure for holding the canvas canopy is exposed to high forces which result in considerable deflection movements of those elements. If now a telescopic load beam which Is prestressed for example by means of a spring were to follow such deflection movements, then an extremely unstable condition could occur precisely the case involving a heavy load.

DE-U1 743 996 discloses a telescopic load beam.

In addition U.S. Pat. No. 5,472,301 discloses a load securing system with a telescopic load beam which also has an elongate profile element and a telescopic element which is displaceable relative thereto, and both elements can be fixed in a relative position with respect to each other. A further embodiment of a telescopic load beam of that kind is known from U.S. Pat. No. 4,079,677.

Therefore the object of the present invention is to provide a load beam for canvas-back vehicles, which—for the purposes for example of simplified assembly—is still telescopically variable in length but which in particular while the vehicle is travelling does not suffer from the stability disadvantages of a load beam as is known from the state of the art and which is simplified in terms of handling.

SUMMARY OF THE INVENTION

The foregoing object is attained by providing a telescopic load beam with longitudinal arresting.

Advantageously, the locking arrangement which is formed in a structurally simple manner from the pivotal lever and the engagement portion makes it possible to rapidly and easily achieve the locking action, which is advantageous according to the invention, between the longitudinally displaceable portions of the load beam, in which respect it is particularly preferred that the locking arrangement assumes an engaged condition merely by the profile element and the telescopic element being pulled apart, more specifically by virtue of the fact that in accordance with the design configuration involved and preferably the retaining lever drops under the effect of its own weight and accordingly automatically into the locking position.

A particularly advantageous embodiment lies in the implementation of the profile element in the form of a box profile member, within which then the telescopic element which in a further preferred feature is formed by means of at least one U-shaped profile memory is movably mounted. In that way a pin element which is provided for limiting the longitudinal stroke motion and which co-operates with a suitably shaped slot can then additionally take over the part played by the engagement portion, onto which the pivotal lever then engages for affording the arresting action.

It is further preferred for the pivotal lever to be disposed in the interior of one of the U-shaped profile portions of the telescopic element, which are provided in accordance with a development of the invention, in that case not only providing protection from soiling and contamination but also affording the possibility of limiting the maximum deflection movements of the pivotal lever.

In accordance with a further development, it is also provided that the load beam according to the invention is embodied in the form of a tandem beam.

BRIEF DESCRIPTION OF THE DRAWINGS

Further advantages, features and details of the invention will be apparent from the following description of specific embodiments and with reference to the drawings in which:

FIG. 2 shows a side view of an end portion of the telescopic load beam according to the invention in a first embodiment in the inserted, non-arrested condition, FIG. 3 shows a sectional view through the arrangement illustrated in FIG. 2, FIG. 4 shows a diagrammatic view of the telescopic load beam according to the invention of a second embodiment with a locking element in the locking condition.

DETAILED DESCRIPTION

Figure 1:
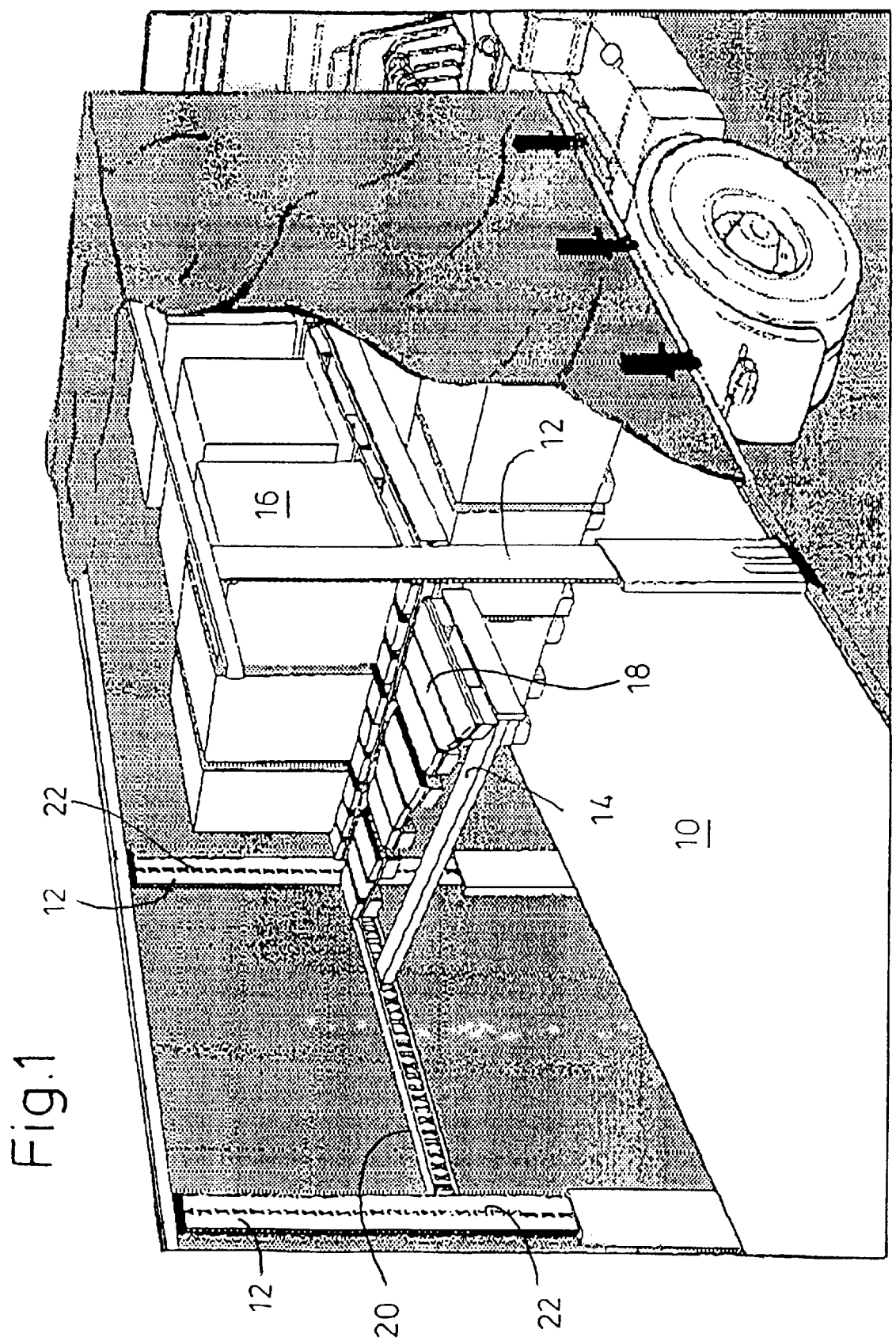
FIG. 1 shows a perspective view of the load space of a canvas-back vehicle with the mounting of the telescopic load beam according to the invention.

The telescopic load beam according to the invention is provided for canvas or canopy superstructures above a load surface 10 of a commercial vehicle (illustrated diagrammatically), which are embodied by means of a plurality of stanchions or uprights 12 which extend at the edges vertically from the load surface 10. As shown in FIG. 1, a load beam 14 which extends approximately at half the height of the uprights 12 transversely through the load space is provided for supporting load material 16 or subjacent load material carriers 18; that permits double-story loading in the load space of the canvas-back vehicle.

The load beam 14 is held at both sides in a longitudinal beam 20 which respectively extends between two uprights 12 at one side of the vehicle and which, for insertion and fixing of a respective end of the load beam 14, has a diagrammatically illustrated horizontal rail for receiving an engagement end of the load beam 14, and which sits preferably adjustably in respect of height in the uprights 12 by means of guide rails (not shown). In addition the uprights 12 have a vertical rail 22 which can also directly receive a respective engagement end of a load beam.

Simple fitting of a load beam 14 in such a carrier system and reliable lengthwise fixing of the load beam, which markedly improves the stability of the overall structure, will be described hereinafter with reference to the detailed views in FIGS. 2 through 4.

Thus, the load beam 14 which is diagrammatically shown in FIG. 1 comprises a rectangular profile member 24 of a contour as shown in FIG. 3, embodied for example in the form of an aluminum extrusion, in the interior of which an inner portion 26 is telescopically guided. More precisely, the inner portion 26 is constructed by means of two U-shaped profile members 28 which face away from each other and which are fixedly connected together and which are arranged slidably in the interior of the rectangular profile member 24.

A maximum longitudinal stroke movement in respect of the telescopic longitudinal displacement as between the inner portion 26 and the rectangular profile member 24 is achieved by a transverse pin 30 which at the end extends transversely through the internal space of the profile element 24 and is fixedly connected thereto at both sides. The transverse pin 30 co-operates with a longitudinal groove 32 which is correspondingly centrally formed in the inner portion, as an abutment, which in the illustrated embodiment permits a longitudinal stroke movement of about 150 mm (with profile member dimensions of 88×66 mm and an overall length of the profile member 24 which is provided in dependence on a respective load space width).

A locking element which is in the form of a pivotal lever 34 and which is fixed rotatably about a pivot axis 36 extending transversely through the inner portion 26 makes it possible to fix the relative position between the (outer) rectangular profile member 24 and the inner portion 26, more specifically in that, at a predetermined relative position of the two beam elements, retaining grooves 38 provided in the pivotal lever at the end thereof—in opposite relationship to the pivot axis 36—engage over the transverse pin 30 and thereby fix same (and accordingly the rectangular profile member 24).

As can be seen in particular in the partly sectional side view of FIG. 2 or the cross-sectional view in FIG. 3, the range of pivotal movement of the lever 34 in the upward direction is limited by a limb of one of the U-shaped profile members 28, and likewise in the downward direction by the oppositely disposed limb of that profile member 28. In that way the pivotal lever is not only protected and raised in a compact fashion in the interior of the telescopic beam arrangement; in addition for example the illustrated configuration of the locking element in the form of a plate-shaped element which is provided on one side (or in a doublesided arrangement) with respect to the inner portion 26, with a ramp portion 40 which rises to a first retaining groove 38, ensures that, by simply pulling apart a load beam 14 which is inserted for example with its engagement edge 42, it is fixed in its desired position and in particular cannot be pulled apart or compressed due to movements of the carrier arrangement in the load space while the vehicle is moving. That accordingly markedly improves the stability of the entire load arrangement so that in particular also the advantageous dual-story or multi-story charging for canvas-back vehicles becomes possible.

The illustrated configuration thus structurally provides that an operator, for assembly purposes, pulls the telescopic arrangement apart and as a result the pivotal lever is engaged in a first retaining groove and thus the length thereof is fixed. If for example the geometrical factors involved should have the result that the overall length of the load beam which is determined in that way is still not sufficient, then by manual actuation (release) of the pivotal lever, it can be pivoted out of its retaining position, whereupon then the inwardly disposed telescopic element can also be further pulled out. Since, as shown for example in FIG. 2, in the latched condition of the pivotal lever, it is disposed substantially outside the surrounding rectangular profile member, manual access from the side is possible without any difficulty.

FIG. 4 shows an alternative embodiment of the pivotal lever 34; the pivotal lever 34' shown in FIG. 4 has openings 38' in the pivotal element 34', which are shaped to correspond to another purpose of use, acting as retaining grooves which establish a respective telescopic stroke movement of the extended inner portion 26.

Figure 5:
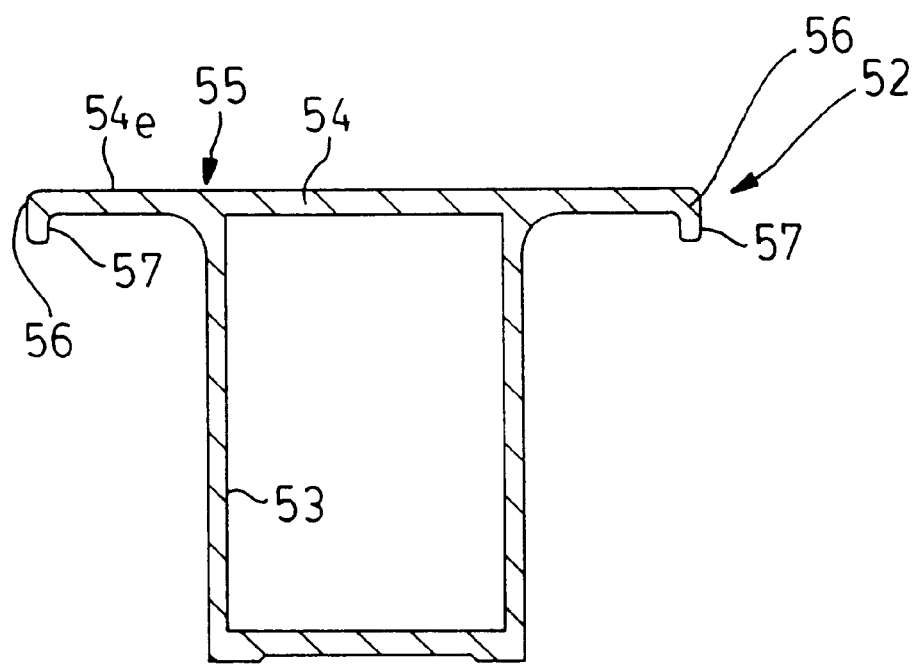
FIG. 5 shows a cross-section of a preferred load beam profile configuration.

The present invention is also not restricted to the illustrated load beam form; thus it is also in particular possible for the profile portion of the load beam—depending on the respective purpose of use involved—also to be embodied in the form of a so-called tandem load beam. A corresponding load beam profile configuration is disclosed in the applicants' German Utility Model No. G 94 14 683 and is shown in FIG. 5. According to FIG. 5, the box profile member 52 comprises a tandem beam 55 having profile walls 53, upper web portion 54 and projecting flange strips 54e. The extending flanges 54e have curved hook bar portions 57 on free ends 56.

While preferably the telescopic load beam provided in accordance with the invention is made from aluminum (profile member) or steel (inner portion) respectively, it is a matter for the discretion of the man skilled in the art to use other suitable materials and combinations of materials. In addition in particular end fixing or suspension of the load beam is exclusively dependent on a beam system used and independent of the locking arrangement according to the invention for the variation in length of the load beam.

What is claimed is:

1. A telescopic load beam comprising an elongate profile element (24) and a telescopic element (26) received in the profile element and is displaceable longitudinally relative thereto, a locking arrangement for releasably fixing a relative position between the profile element (24) and the telescopic element (26), the locking arrangement (30, 34) comprises a pivotal lever (34) arranged pivotably on the telescopic element and an engagement portion (30) formed to cooperate with a retaining groove (38) in the pivotal lever, the engagement portion is fixed to the profile element, and wherein the pivotal lever (34) includes means for engaging a first locking position of the profile element (24) and the telescopic element (26), wherein the engagement portion (30) limits a maximum longitudinal displacement between the profile element (24) and the telescopic element (26).

2. A load beam as set forth in claim 1 Wherein the profile element is a box profile member and the telescopic element is disposed displaceably in the interior of the box profile member.

3. A load beam as set forth in claim 2 wherein the engagement portion comprises a pin element fixedly connected to opposed side walls of the box profile member.

4. A load beam as set forth in claim 3 wherein the pin element engages an axially extending slot formed in the telescopic element.

5. A load beam as set forth in claim 2 wherein the box profile member comprises a tandem beam with flange strips projecting in cross-section on both sides of the box profile member.

6. A load beam as set forth in claim 5 wherein the flange strips are parts of an upper web portion of the box profile member, the box profile member has profile walls and the upper web portion is formed on the profile walls, wherein the flange strips have free ends shaped as a hook bar portion.

7. A beam as set forth in claim 1 wherein the telescopic element is made from at least one profile element of U-shaped cross-section.

8. A load beam as set forth in claim 7 wherein the telescopic element comprises a pair of mutually connected U-shaped profile members which face away from each other and are of cross-sectional dimensions which are smaller than the internal width of the box profile member.

9. A load beam as set forth in claim 7 wherein the pivotal lever is pivotably secured to a central portion of the element of U-shaped cross section.

* * * * *